United States Patent [19]

Kehr et al.

[11] Patent Number: 5,241,014

[45] Date of Patent: Aug. 31, 1993

[54] PROCESS FOR THE PRODUCTION OF LARGELY AMORPHOUS POLYALPHAOLEFINS WITH A NARROW MOLECULAR WEIGHT DISTRIBUTION

[75] Inventors: Helmut Kehr, Schermbeck; Adolf Kühnle, Marl; Heinrich Leppek, Gelsenkirchen-Buer; Matthias Schleinzer, Dorsten, all of Fed. Rep. of Germany

[73] Assignee: Huels Aktiengesellschaft, Marl, Fed. Rep. of Germany

[21] Appl. No.: 639,479

[22] Filed: Jan. 10, 1991

[30] Foreign Application Priority Data

Jan. 12, 1990 [DE] Fed. Rep. of Germany ....... 4000695

[51] Int. Cl.$^5$ .............................. C08F 8/50
[52] U.S. Cl. ............... 525/376; 525/333.7; 525/333.8; 525/387
[58] Field of Search ................ 525/387, 376

[56] References Cited

U.S. PATENT DOCUMENTS

| | | | |
|---|---|---|---|
| 4,833,209 | 5/1989 | Beijleveld et al. | 525/387 |
| 5,037,895 | 8/1991 | Marker et al. | 525/333.9 |
| 5,047,485 | 9/1991 | De Nicola, Jr. | 525/387 |

Primary Examiner—Bernard Lipman
Attorney, Agent, or Firm—Millen, White, Zelano & Branigan

[57] ABSTRACT

A process for the production of largely amorphous polyalphaolefins with a narrow molecular weight distribution is provided where the products exhibit the following features:

softening point between 70° and 40° C.;
melt viscosity (190° C.) between 1,000 and 100,000 mPas;
density less than 0.90 g/cm$^3$;
needle penetration between 5 and 50 0.1 mm; and
maximum molecular inhomogeneity 6.

These polymers are obtained by a radical decomposition performed at high temperatures on copolymers based on $C_{4-10}$ alpha-olefins, propene and optionally ethene. The products are suitable for use as hot melt adhesives as well as for heavy coating compounds.

11 Claims, No Drawings

PROCESS FOR THE PRODUCTION OF LARGELY AMORPHOUS POLYALPHAOLEFINS WITH A NARROW MOLECULAR WEIGHT DISTRIBUTION

BACKGROUND OF THE INVENTION

The invention relates to a process for the production of largely amorphous polyalphaolefins and the polymer obtained therefrom, which are characterized by a softening point (measured by the ring and ball method corresponding to DIN 52 011) between 70° and 140° C., a melt viscosity (at 190° C.) between 1,000 and 100,000 mPas (determined by the methods described in ASTM D 3236), a density less than 0.90 g/cm$^3$, a needle penetration (determined by the methods described in DIN 52 010) of 5 to 50 0.1 mm and a molecular inhomogeneity, $U = Mw/Mn - 1$ (determined by gel permeation chromatography), of at most 6.

Reaction systems, consisting of reacting a polyolefin and a radical donor are known. Homopolymers and copolymers of ethene can be crosslinked in the presence of radical donors with energy input. According to the rise in the molecular weight, elastomeric, i.e., rubber-like, products with improved dimensional stability at higher temperatures or improved chemical resistance are obtained.

In addition, homopolymers based on propene can be mechanically/thermally or radically decreased in molecular weight. The end products, in comparison with the starting polymers, have a higher melt flow index and, according to experience, a narrower molecular weight distribution. The latter process step has gained particular importance for the production of fiber material.

In the case of amorphous or largely amorphous polyalphaolefins, comparable process steps have not been taken in practice, since a practical use could not be seen. At most, an exception in some respect is made in the case of atactic polypropylene (APP) occurring during the production of isotactic polypropylene where high molecular weight APP must be subjected to a decomposition step to be able to be marketed at all. The starting product in such cases has a softening point (ring and ball method) of over 150° C. as well as a melt viscosity (at 190° C.) of over 200,000 mPas, often even far over 500,000 mPas. The decomposition step usually leads to products with melt viscosities (at 190° C.) between 50,000 and 200,000 mPas, which have few noncritical uses such as, for example, bitumen modification.

Because of this experience with polyolefins, it would be expected that decomposition and crosslinking occur as competing reactions in polyolefins, which are not synthesized exclusively from propene, such as, for example, ethene/propene/1-butene terpolymers. Therefore, no appreciable lowering of the molecular weight or narrowing of the molecular weight distribution are expected to occur.

SUMMARY OF THE INVENTION

It has been found that binary and ternary, largely amorphous copolyalphaolefins with the following monomer composition are well suited as starting materials for the process according to the invention:

3 to 75% by weight of an alpha-olefin with 4 to 10 carbon atoms;
25 to 95% by weight of propene;
0 to 20% by weight of ethene.

Preferred copolyolefin starting materials and the products produced therefrom according to the invention, are either completely amorphous or exhibit only slight crystallinity. Generally a degree of crystallinity of 25%, determined by x-ray diffraction, is not to be exceeded.

An object of the present invention is to provide a method for reducing the melt viscosity and the molecular weight distribution of a substantially amorphous polyalphaolefin.

It is another object of the present invention to provide amorphous polyalphaolefins with a reduced melt viscosity and molecular weight distribution while substantially maintaining other physical properties.

It is a further object of the present invention to provide amorphous polyalphaolefins with low melt viscosity, high cohesion and high adhesion to substrates Further objects will be apparent from the detailed disclosure and claims which follow.

Surprisingly, it has been found that treatment of these polyalphaolefins with radical donors not only lowers the molecular weight but at the same time narrows the molecular weight distribution. This means that molecular inhomogeneity U, defined by the relation $U = (Mw/Mn) - 1$, becomes smaller, where the molecular weight data, Mw and Mn, represent the weight average and numerical average molecular weight, respectively, as determined by gel permeation chromatography.

It is also possible, despite the decomposition step, to substantially maintain certain mechanical properties of the high molecular weight starting material in the lower molecular weight end product, such as, e.g., elongation at break.

Products of a specific melt viscosity obtained by the process according to the invention have properties different in general from products whose melt viscosity has the same value but which were produced exclusively by direct polymerization. The products according to the invention have, for example, an improved sprayability, in comparison with products of similar viscosity produced by direct polymerization. This is the object of German patent application P 40 00 696.4, filed on Jan. 12, 1990.

In addition, the products produced according to the invention are advantageously used as heavy coating compounds for carpets, as they are described inter alia in EP-A-0 309 674. The low melt viscosity, coupled with a high elongation at break, makes possible an increase in the filler portion in the filled coating compound, as a result of which the formulation can be reduced in price. Despite the higher filler portion, such compounds have a sufficient mechanical strength and flexibility. Since in contrast with usual compounds it is possible to start from a lower melt viscosity in the polymer, its processability such as its ability to be applied by knife and brush is not adversely affected by the increase of the filler portion.

Also with hot melt adhesives it is advantageous that the quotient formed from melt viscosity and elongation at break be small. In practice this means that the polymer, despite low melt viscosity, which is favorable for certain working processes, such as, e.g., spraying, has sufficient cohesion and extensibility.

The starting products for the process according to the invention are specifically polymerized on classic Ziegler catalysts or a modified version thereof. Such a process is described, for example, in DE-PS 23 06 667. Generally a largely amorphous polyalphaolefin with a softening point (ring and ball method) between 70° and 140° C., a melt viscosity at 190° C. between 5,000 and 200,000 mPas, a density less than 0.90 g/cm$^3$ and a needle penetration of 100/25/5 (weight of needle: 100 g; temperature 25° C.; duration 5 s) between 5 to 50 0.1 mm at a temperature above the softening point is reacted in the presence of a radical donor under shear stress. As a result, the melt viscosity (measured at 190° C.) is reduced by at least half.

The starting polyolefin typically has a tensile strength between 0.5 and 10 N/mm$^2$ and a elongation at break of over 200%.

Within in the framework of this invention, polyalphaolefins which are synthesized from the monomers propene, 1-butene and optionally ethene are preferred. Particular suitable amorphous polyalphaolefins are propene/1-butene/ethene terpolymers and propene/1-butene copolymers obtainable under the trademark VESTOPLAST ®, e.g., corresponding to DE-PS 23 06 667 or DE-PS 29 30 108. Other polymers which contain an alpha-olefin with 5 to 10 carbon atoms, such as, e.g., 1-pentene, 1-hexene, 4-methyl-1-pentene, 1-heptene, 1-octene or 1-decene, besides or instead of 1-butene, are suitable for use.

The radical donors used according to the invention are first of all compounds containing peroxo groups or diazo groups. Such compounds are offered, e.g., under the trademarks Luazo ®, Luperox ®, Luperco ® and Interox ® by the Pennwalt and Peroxid-Chemie GmbH companies partly in substantially pure form, partly in dilute form on a support. Such compounds have a 10-hour half-life in benzene at temperatures between 50° and 200° C. They are generally worked in at temperatures between 60° and 200° C. and are used in their function as radical donors at temperatures between 100° and 300° C. The added amounts are between 0.05 and 3% by weight, but preferably between 0.2 and 1% by weight. Typical representatives are dicumyl peroxide, 2,5-dimethyl-2,5-di-(t-butylperoxy)-hexane as well as 2,2'-azo-bis(2-acetoxy-propane), which have a 10-hour half life in benzene at temperatures of about 115° C., about 120° C. or about 190° C., respectively.

The decomposition reaction is usually performed at temperatures above the softening point of the polyalphaolefin, preferably between 150° and 250° C. under a nitrogen atmosphere. Suitable as apparatus are both extruders and stirring and mixing units used in hot melt production. The level of shear applied to the reaction mixture is not critical but it is preferably equivalent to the shear stress generated within a Meili Laboratory kneader such as is identified in the examples. Shear compounding to an angular velocity of at least $10^{-1}$ is preferred.

Of course, parallel to or directly in connection with the production process according to the invention, radically catalyzed reactions such as, e.g., graft reactions with monomers containing double bonds, which carry at least one functional group, can take place. Suitable monomers are, for example, maleic anhydride, fumaric acid, acrylic acid and methacrylic acid, itaconic acid, aconitic acid and their derivatives such as, e.g., esters or amides as well as vinyltrimethoxysilane (VTMO) and 3-methacryloxypropyltrimethoxysilane (MEMO; $H_2C=C(CH_3)COO(CH_2)_3Si(OCH_3)_3$. They are usually used in amounts of 0.1 to 10% by weight, preferably 0.5 to 5% by weight, relative to the polyalphaolefin. In this way, polymers with lowered melt viscosity, high cohesion and improved adhesion with certain substrates such as metal, plastic or glass surfaces are obtained.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth in degrees Celsius and unless otherwise indicated, all parts and percentages are by weight.

The entire disclosures of all applications, patents and publications, cited above and below, and of corresponding application Federal Republic of Germany P 40 00 695.6, filed Jan. 12, 1990, are hereby incorporated by reference.

EXAMPLES

EXAMPLE 1

An ethene/propene/1-butene terpolymer (polyalphaolefin A), which was previously mixed with 0.5% by weight of Luperco ® 101 XLS (2,5-dimethyl-2,5-di-(t-butylperoxy)-hexane, 45%), is kneaded under a nitrogen atmosphere at a temperature of 185° C. for 50 minutes in an oil-heated Meili laboratory kneader (alternately a laboratory extruder can also be used). In this case air must be excluded carefully (e.g. by previous flushing of the equipment with nitrogen; optionally the addition of 0.2% by weight of antioxidant such as, e.g., Irganox ® 1010 is advantageous).

The properties of the starting product and end product are shown in Table 1 below.

TABLE 1

| Properties: | Starting Product (polyalphaolefin A) | End Product (polyalphaolefin 1) |
|---|---|---|
| Density, g/cm$^3$ | 0.87 | 0.87 |
| Composition: | 5% by weight of ethene 65% by weight of propene 30% by weight of 1-butene | |
| Melt viscosity at 190° C., mPas | 50,000 | 7,800 |
| Softening point (ring and ball) °C. | 110 | 103 |
| Needle penetration 0.1 mm | 14 | 17 |
| Elongation at break, % | 950 | 680 |
| Molecular weight, Mw | 91,000 | 60,000 |
| Molecular weight Mn | 11,000 | 10,000 |
| Molecular inhomogeneity U | 7.3 | 5 |
| Quotient $\frac{\text{melt viscosity}}{\text{elongation at break}}$ | 52 | 11.4 |

An ethene/propene/1-butene terpolymer, produced by direct polymerization on the same catalyst system as polyalphaolefin A, having the same monomer composition and a melt viscosity (at 190° C.) of 8,000 mPas, has an elongation at break of 300%. The quotient of melt viscosity and elongation at break is 26.6.

EXAMPLE 2

The procedure as described in Example 1 is repeated with another ethene/propene/1-butene terpolymer (polyalphaolefin B) as a starting product. The starting product has a melt viscosity (at 190° C.) of 8,000 mPas.

Other properties of the starting product and end product are shown in Table 2 below.

TABLE 2

| Properties: | Starting Product (polyalpha-olefin B) | End Product (polyalpha-olefin 2) |
| --- | --- | --- |
| Density, g/cm³ | 0.87 | 0.87 |
| Composition: | 5% by weight of ethene 65% by weight of propene 28% by weight of 1-butene | |
| Melt viscosity at 190° C., mPas | 8,000 | 2,700 |
| Softening point (ring and ball) °C. | 105 | 104 |
| Needle penetration 0.1 mm | 20 | 23 |
| Elongation at break, % | 300 | 170 |
| Molecular weight, Mw | 61,000 | 45,000 |
| Molecular weight Mn | 7,500 | 7,300 |
| Molecular inhomogeneity U | 7.1 | 5.1 |
| Quotient $\frac{\text{melt viscosity}}{\text{elongation at break}}$ | 26.6 | 15.8 |

An ethene/propene/1-butene terpolymer produced by direct polymerization on the same catalyst system as polyalphaolefin B having the same monomer composition and a melt viscosity (at 190° C.) of 2,900 mPas, has an elongation at break of 90%. The quotient of melt viscosity and elongation at break is 32.2.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for the production of substantially amorphous polyalphaolefins having a softening point between 70° and 140° C., a melt viscosity at 190° C. between 1,000 and 100,000 mPas, a density less than 0.90 g/cm³, a needle penetration of 5 to 50 0.1 mm and a molecular inhomogeneity, determined by gel permeation chromatography, of at most 6, said process comprising reducing the melt viscosity determined at 190° C., of a substantially amorphous polyalphaolefin starting material in the presence of a radical donor under shear stress at a temperature above the softening point of the polyalphaolefin, wherein the substantially amorphous polyalphaolefin starting material has the following monomer composition:

3 to 75% by weight of an alpha-olefin with 4 to 10 carbon atoms,
25 to 95% by weight of propene and
0 to 20% by weight of ethene, and
a softening point between 70° and 140° C., a melt viscosity at 190° C. between 5,000 and 200,000 mPas, a density less than 0.90 g/cm³ and a needle penetration of 5 to 50 0.1 mm.

2. A process according to claim 1, wherein the substantially amorphous polyalphaolefin starting material exhibits a tensile strength between 0.5 and 10 N/mm² and an elongation at break greater than 200%.

3. A process according to claim 1, wherein the substantially amorphous polyalphaolefin starting material is a binary or ternary copolymer of the monomers 1-butene, propene and optionally ethene.

4. A process according to claim 1, wherein the reduction in melt viscosity with a radical donor is performed at temperatures between 150° and 250° C. under nitrogen atmosphere.

5. A process according to claim 1, wherein the radical donor is a compound having a peroxo or diazo group and is used in an amount between 0.05–3.0 wt. %, based on the weight of polyalphaolefin starting material.

6. A process according to claim 5, wherein the radical donor is dicumyl peroxide, 2,5-dimethyl-2,5-di-(t-butyl-peroxy)-hexane or 2,2'-azo-bis(2-acetoxy-propane).

7. A process according to claim 1, wherein the substantially amorphous polyalphaolefin produced has a quotient of melt viscosity (at 90° C.) and % elongation at break that is below 20.

8. A process according to claim 1, wherein the polyalphaolefin starting material is an ethene/propene/1-butene terpolymer or a propene/1-butene copolymer.

9. A process for reducing the melt viscosity and molecular weight distribution of a substantially amorphous polyalphaolefin which comprises:

decompositing a substantially amorphous polyalphaolefin of 0–20% ethene, 25 to 95% propene and 3 to 75% 1-butene having a melt viscosity at 190° C. between 5,000–200,000 mPas, with a 0.05–3.0 wt. % of a radical donor compound having a peroxo or diazo group, under shear stress at a temperature in the range of 150°–250° C.

10. A process according to claim 9, wherein the amorphous polyalphaolefin is put under shear stress within an extruder or kneader.

11. A process according to claim 9, wherein the substantially amorphous polyalphaolefin product has a melt viscosity at 190° C. between 1000 and 100,000 mPas, a density less than 0.90 g/m³, a needle penetration of 5 to 50 0.1 mm, a molecular inhomogeneity below 6 and quotient of melt viscosity (at 190° C.) and % elongation at break that is below 20.

* * * * *